J. PALMOWSKI.
MOUSE OR RAT TRAP.
APPLICATION FILED APR. 14, 1913.
1,093,880.
Patented Apr. 21, 1914.
2 SHEETS—SHEET 1.
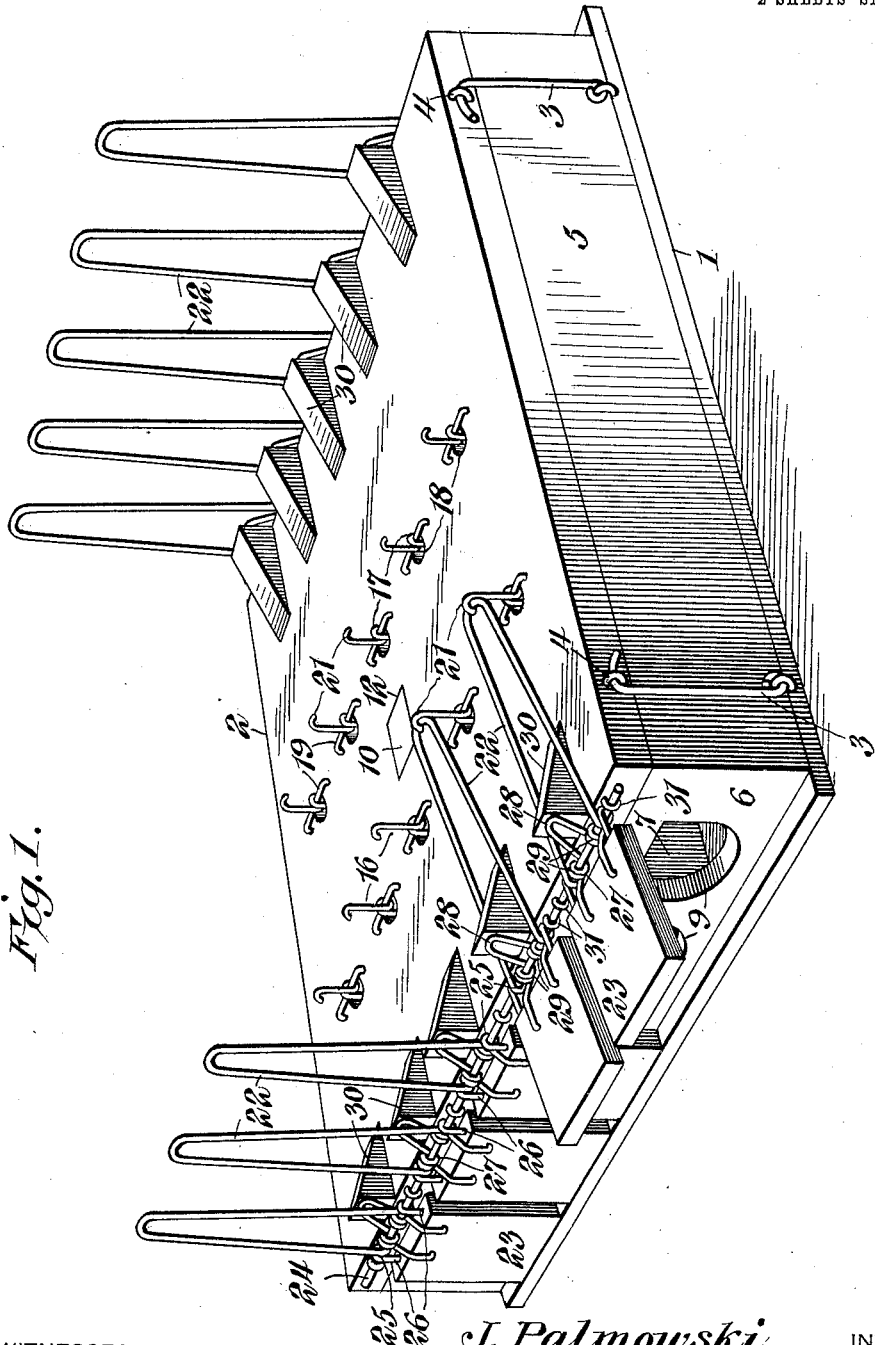
WITNESSES
Howard D. Orr.
J. F. Riley
J. Palmowski, INVENTOR,
BY E. G. Siggers
ATTORNEY J. PALMOWSKI.
MOUSE OR RAT TRAP.
APPLICATION FILED APR. 14, 1913.
1,093,880.
Patented Apr. 21, 1914.
2 SHEETS—SHEET 2.
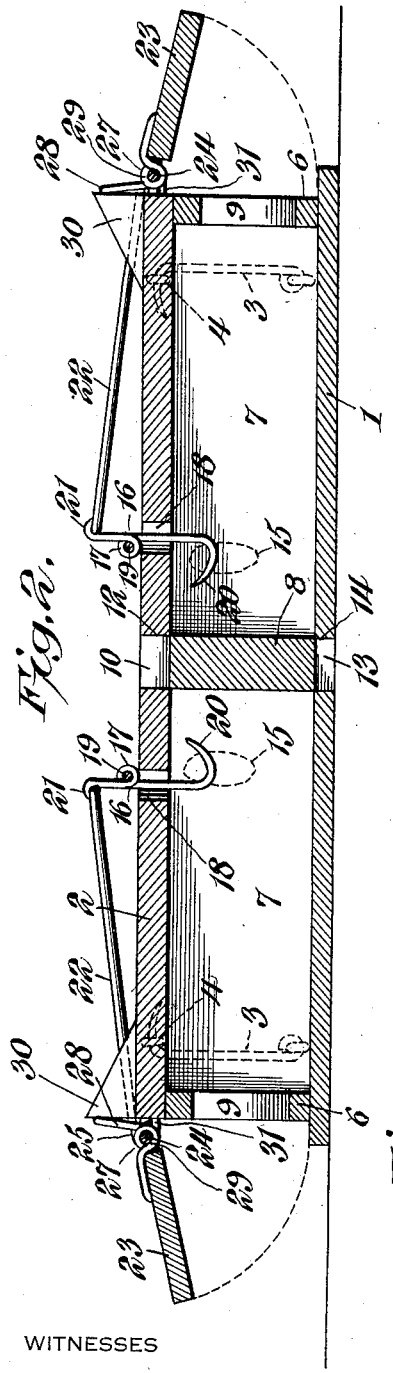
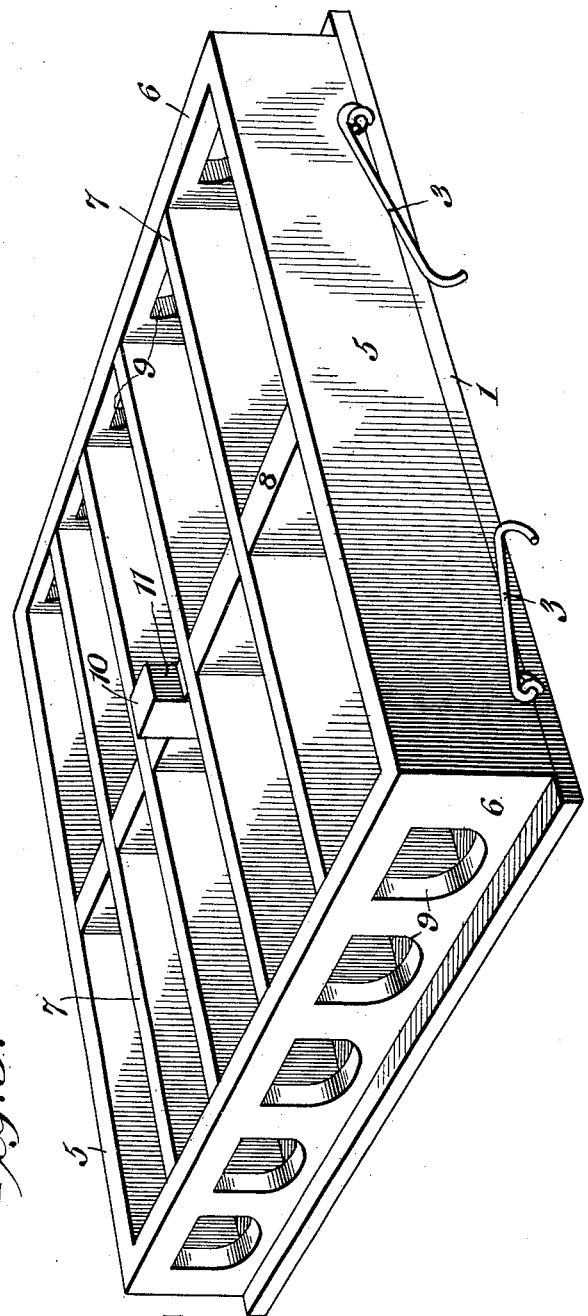

UNITED STATES PATENT OFFICE.

JOSEPH PALMOWSKI, OF WILKES-BARRE, PENNSYLVANIA.

MOUSE OR RAT TRAP.

1,093,880.  Specification of Letters Patent.  Patented Apr. 21, 1914.

Application filed April 14, 1913. Serial No. 761,016.

*To all whom it may concern:*

Be it known that I, JOSEPH PALMOWSKI, a citizen of the United States, residing at Wilkes-Barre, in the county of Luzerne and State of Pennsylvania, have invented a new and useful Mouse or Rat Trap, of which the following is a specification.

The invention relates to improvements in traps for mice or rats.

The object of the present invention is to improve the construction of traps for mice or rats, and to provide a simple, inexpensive and efficient trap, adapted for catching with one setting a comparatively large number of mice or rats, and capable of causing such animals when caught to attract other animals and induce the same to enter it.

A further object of the invention is to provide a mouse or rat trap of this character in which the captured animals will not die in the trap so that the latter will not be affected by bad odors and may be used continuously without disinfecting it.

Another object of the invention is to provide a trap having a relatively large number of separate compartments, and capable of being easily and quickly baited and readily set.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawings:—Figure 1 is a perspective view of a trap, constructed in accordance with this invention. Fig. 2 is a longitudinal sectional view of the same. Fig. 3 is a perspective view of the body of the trap, the top being removed.

Like numerals of reference designate corresponding parts in all the figures of the drawings.

In the accompanying drawings in which is illustrated the preferred embodiment of the invention, the trap, which is designed in practice to be constructed of two sizes to adapt it either for catching mice or rats, comprises in its construction a rectangular casing composed of a body portion 1 and a removable top 2, detachably secured on the body portion by means of hooks 3 and eyes 4, arranged in pairs at opposite sides of the trap, but any number of hooks and eyes or other suitable fastening means may be employed for detachably securing the top of the casing to the body thereof. The casing is designed to be constructed of any suitable material, which will render it non-transparent so that the captured animals cannot be seen either from the exterior or by animals entering the trap, and the body is composed of a horizontal bottom, vertical side walls 5 and end walls 6. The space inclosed by the side and end walls is divided into two sets or series of narrow compartments by longitudinal and transverse partitions 7 and 8, the transverse partitions being arranged in alinement midway between the end walls 6, as clearly illustrated in Fig. 3 of the drawings, and closing the compartments at the inner ends thereof. The end walls 6 are provided at the outer ends of the narrow compartments with entrance openings 9 of a size to permit a mouse or rat to enter the trap. The longitudinal and transverse partitions have their upper edges arranged in the same horizontal plane as the upper edges of the side and end walls, and the removable top fits flat against all of the said upper edges, and it is centered by an upwardly projecting portion 10 of a post 11, located at the center of the body of the trap and projecting above the partitions and fitting in a central opening 12 of the top 2. The post, which is preferably rectangular, has its lower end 13 fitted in a central opening 14 in the bottom of the body. The openings 12 and 14 are preferably rectangular, but a post of any other configuration may, of course, be employed.

The casing is relatively low, and the compartments are constructed of a width and height to prevent a mouse or rat entering a compartment from turning around therein, so that after an animal is caught in the trap, it will be confined in close proximity to a bait 15 to cause the animal after being caught to continue gnawing the bait for the purpose of attracting other animals and causing the same to enter the trap. The bait is supported by a plurality of setting devices 16, located adjacent to the inner ends of the compartments a sufficient distance from the outer ends thereof to permit a mouse or rat to enter completely the trap before attacking the bait. Each setting device 16 is designed to be constructed of wire, or other suitable material and it consists of an upright lever, provided at an intermediate point with an eye 17 and extending through an opening 18 in the removable top 2, and pivotally mounted thereon by means of a pintle 19, which passes through the eye 17. The pintle spans the opening 18, and its terminals are bent downwardly and embedded in the removable top 2. The lower arm or portion of the setting device is bent inwardly and upwardly to form a bait hook 20, the bill of which extends in the direction of the inner end of the compartment. The upper arm or portion of the setting device has its terminal curved outwardly substantially at right angles to the body portion of the setting device to form a setting hook 21 for engaging an arm 22 of a hinged door 23.

The individual doors 23 for the sets or series of the compartments of the trap are carried by the removable top 2, and are hinged to the same by pintle rods 24 passing through eyes 25 of the arms 22. The arms 22 are preferably constructed of stout wire bent to form substantially U-shaped loops and having the sides coiled near their lower ends to form the said eyes 25, the lower terminals 26 of the sides being embedded in the doors 23. The doors 23 may be constructed of any suitable material, either wood or metal, and they are maintained in a closed position by springs 27, constructed of resilient wire, each spring being composed of a central loop 28 and side coils 29, which are disposed on the pintle rod 24. The loop 28 extends upwardly and bears against a block 30, secured to the removable top and arranged to project through the arm 22 when the trap is set, as clearly illustrated in Fig. 1 of the drawings, and the terminals of the spring 27 bear against the outer face of the door 23. The blocks, which are arranged at the end edges of the top 2, are preferably triangular and present outer vertical edges to the springs. The pintle rods 24 are preferably continuous, as shown, and are mounted in eyes formed by staples 31, but the spring actuated doors may be hinged in any other suitable manner.

The top of the casing is removable to afford access to the bait hooks, so that the trap may be easily and quickly baited. After the bait has been placed on the hooks of the setting devices, the top is replaced and secured on the body of the trap, and the arms of the hinged doors are swung downwardly and inwardly and engage with the setting hooks. A mouse or rat attracted by the bait and entering one of the compartments will on gnawing the bait trip the setting devices and release the hinged spring actuated door, which will close and confine the animal in the low narrow compartment. As it will be impossible for the animal to turn in the compartment, it will be confined therein with its head in close proximity to the bait, and as the mouse or rat is not injured by the trap it will continue gnawing the bait and thereby attract other mice or rats and cause the same to enter the other compartments. The mice or rats approaching the trap hearing the gnawing interiorly thereof and not seeing the captured mice or rats will enter a compartment and be caught in the trap. In this manner a large number of animals may be captured at one setting of the trap, and as the captured animals are not killed, the trap will not be affected by any bad odor, and it may be used continuously without disinfecting it. The captured animals may be destroyed in any suitable manner.

What is claimed is:—

A trap of the class described including a body composed of a bottom, side and end walls, the end walls being provided with entrance openings, partitions dividing the space within the body into compartments extending inwardly from the entrance opening and closed at their inner ends, a central post mounted within the body and projecting above the partitions thereof, a removable top detachably secured on the body and having a central opening receiving the upper end of the post, whereby the top is interlocked with the body, hinged spring actuated doors carried by the top and arranged to cover the entrance openings, and setting devices for the said doors also mounted on and carried by the said top and having bait holding means extending into the said compartments.

In testimony, that I claim the foregoing as my own, I have hereto affixed my signature in the presence of two witnesses.

JOSEPH PALMOWSKI.

Witnesses:
  GEO. TOMASCIK,
  JOS. REIDEMEN.